3,769,328
8-MERCAPTO-p-MENTHAN-3-OL AND ESTER
DERIVATIVES
Dietmar Lamparsky, Wangen-Dubendorf, and Peter
Schudel, Grut, Switzerland, assignors to Givaudan Corporation, Clifton, N.J.
No Drawing. Filed Nov. 8, 1971, Ser. No. 201,591
Claims priority, application Switzerland, Nov. 20, 1970,
17,215/70
Int. Cl. C01c *149/26*
U.S. Cl. 260—486 R      8 Claims

ABSTRACT OF THE DISCLOSURE

There are disclosed novel p-menthane derivatives, more particularly, 8-mercapto-p-menthan-3-ol and O-acyl derivatives thereof, a process for the manufacture thereof and odorant and/or flavouring compositions containing same.

SUMMARY OF THE INVENTION

The p-menthane derivatives provided by the present invention have the following general formula

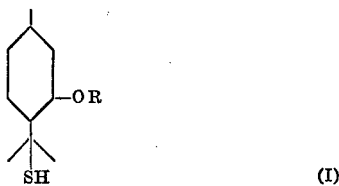

wherein R represents a hydrogen atom or a $C_1$–$C_5$ acyl group.

The p-menthane derivatives of the foregoing general formula are distinguished by particular fragrance and distinguished by particular fragrance and flavour properties.

According to the process provided by the present invention, the p-menthane derivatives of the foregoing general formula are manufactured by reducing p-menthane-8-thiol-3-one with a complex metal hydride and, if desired, acylating the hydroxyl group of the resulting 8-mercapto-p-menthan-3-ol.

DESCRIPTION OF THE PREFERRED EMBODIMENTS

The p-menthane-8-thiol-3-one starting material can exist in two stereoisomeric forms. The reduction of the keto group to the alcoholic hydroxyl group can, but does not necessarily, double the number of isomers. The p-menthane derivatives of the foregoing general formula can accordingly theoretically exist in 4 steroisomeric forms, and it will be appreciated that the invention includes within its scope all such stereoisomeric forms.

The p-menthane-8-thiol-3-one starting material can be prepared by reacting pulegone or isopulegone with hydrogen sulphide in the presence of a base under anhydrous conditions.

It will be appreciated that the term "$C_1$–$C_5$ acyl" is used in this description and in the accompanying claims to mean an acyl group derived from a saturated or unsaturated, straight-chain or branched-chain aliphatic monocarboxylic acid containing 1 to 5 carbon atoms.

The reduction of the 3-keto group of the p-menthane-8-thiol-3-one starting material using a complex metal hydride can be carried out in a manner known per se; for example, using sodium borohydride or lithium aluminum hydride. The acylation of the resulting 8-mercapto-p-menthan-3-ol to the corresponding O-acyl derivative can also be carried out according to methods which are known per se, expediently using an acid anhydride suitably an anhydride of a $C_1$–$C_5$ carboxylic acid (e.g. acetic acid anhydride) in the presence of a base (e.g. pyridine). The acylation can also be carried out using an appropriate acid halide, for example an acid halide of a $C_1$–$C_5$ carboxylic acid such as acetyl chloride, butyryl chloride tiglyl chloride or the like, in the presence of a base such as pyridine or the like.

8-mercapto-p-menthan-3-ol has, for example, fragrance and flavour properties which may be termed fruity, flat-camphoraceous tending towards buccu camphor, reminiscent of bread-crust, with a slight indole note and a warm-woody side-note reminiscent of oak-moss.

8-mercapto-p-menthan-3-yl acetate, which is particularly interesting for use in aromas, has fragrance and flavour properties which can be paraphrased as follows: fruity, green, floral, minty with marked cassis and buccu oil note.

On the basis of these fragrance and flavour properties, the p-menthane derivatives of the foregoing general formula can be used as odorants and/or flavourings; for example, for the manufacture of odorant compositions such as perfumes (e.g. synthetic geranium reconstitutions) or for perfuming products such as cleansing agents, detergents, soaps, toothpastes and other cosmetic articles, and for the manufacture of flavouring compositions (aromas, aromatizing agents) or for aromatizing foods and delicacies as well as beverages. For use as odorants and/or flavourings, the amount of the p-menthane derivatives of Formula I employed can be varied within wide limits; for example, between 0.005 and 5 wt. percent can be employed in odorant and flavouring compositions or between 0.01–100 p.p.m. can be present in the finished perfumed or aromatized products (e.g. detergents, foodstuffs, beverages etc.).

The following examples illustrate the process provided by the present invention:

EXAMPLE 1

A solution of 9.3 g. of p-menthane-8-thiol-3-one in 30 ml. of absolute ether is slowly added dropwise with cooling, stirring and exclusion of moisture to 1.0 g. of lithium aluminium hydride in 30 ml. of absolute diethyl ether in such a way that the solution boils quite weakly. After completion of the addition, the mixture is stirred for a further 1 hour at the boiling temperature of the ether and subsequently cooled to ca. 0° C. The excess reducing agent is then decomposed by the cautious addition of water. The mixture is thereupon made weakly acidic with a dilute mineral acid (or an organic acid such as tartaric acid), the ether layer is separated off and the aqueous phase is exhaustively extracted with ether. The combined ether solutions are washed neutral, dried and the ether is removed. There are thus obtained 7.6 g. (ca. 80% of theory) of 8-mercapto-p-menthan-3-ol in the form of a stereoisomer mixture in the ratio 60:36:4. The mixture boils at 67°–69° C./0.06 mm. Hg; $n_D^{20}$=1.5026 to 1.5029. In this case, the main component is enriched in the most volatile fractions, whilst the content of the two other isomers lies markedly higher in the end fraction than at the beginning of the distillation.

The p-menthane-8-thiol-3-one used as the starting material can be prepared as follows:

114.0 g. of technical pulegone with a pulegone content of ca. 93% are dissolved in 150 ml. of technical absolute ethanol and treated with a solution of 7.5 g. of potassium hydroxide in 50 ml. of ethanol. Hydrogen sulphide is conducted into the solution, cooled to −75° C., until the increase in the volume amounts to 40 ml. The cold solution is immediately transferred into a suitable previously cooled pressure vessel and allowed to stand for 16 hours, the temperature gradually rising to room temperature. The autoclave is subsequently heated at an internal temperature of 50° C. for 2 hours; the pressure thereby rising to at most 7.4 atmospheres. After completion of the reaction, the mixture is cooled to room temperature. 140 ml. of ethanol are distilled off from the reaction mixture in vacuo on a rotary evaporator. The residue (153 g.) is taken up in 250 ml. of ether, washed twice with 100 ml. of saturated sodium chloride solution each time and subsequently twice with 100 ml. of water each time to neutrality. The ether solution is dried and the ether is subsequently removed. The residue (122.4 g.) is fractionally distilled. The p-menthane-8-thiol-3-one (102 g., 73%) obtained boils at 74°–75° C./0.1 mm. Hg; $n_D^{20}$=1.4951; ratio of the stereoisomers ca. 4:1.

EXAMPLE 2

1.15 g. of sodium borohydride and 2 g. of calcium chloride are dissolved in 10 ml. of absolute ethanol. 10 g. of p-menthane-8-thiol-3-one are added to this mixture and the resulting mixture is left to stand overnight at room temperature with exclusion of moisture. On the next morning, 5 ml. of 10 N sodium hydroxide are added. After heating for a short time, the mixture is allowed to cool, 10 ml. of water are added and insolubles are filtered off. The filtrate is acidified with 7.5 ml. of glacial acetic acid and subsequently concentrated. The residue is made alkaline and extracted twice with 75 ml. of chloroform each time. The combined chloroform solutions are washed with saturated sodium chloride solution and dried, and the solvent is removed. The residue (8.7 g.) contains ca. 70% of 8-mercapto-p-menthan-3-ol and is fractionally distilled in the manner described in Example 1, the pulegone occurring as a byproduct and the 10% of starting material still present being separated off with the head fractions.

EXAMPLE 3

A mixture of 4.5 g. of acetic acid anhydride and 4.3 g. of pyridine is added with external cooling to 8.2 g. of 8-mercapto-p-menthan-3-ol. The mixture is allowed to stand overnight at a temperature of about 0° C., then poured onto crushed ice and dilute hydrochloric acid and exhaustively extracted with ether. The ethereal solution is washed neutral and dried, and the ether is removed. The residue (10 g.) is fractionally distilled in the vacuum of an oil-pump and yields a stereoisomer mixture of 8-mercapto-p-menthan-3-yl acetate of boiling point 72° C./0.8 mm. Hg; $n_D^{20}$=1.4887 to 1.4893.

EXAMPLE 4

9.4 g. of 8-mercapto-p-menthan-3-ol are treated with 7.9 g. of butyric acid anhydride in the presence of 8 g. of pyridine. The mixture is allowed to stand for 15 hours at 0° C. and for a further 2 hours at room temperature. It is then worked up in the manner described in Example 3. The crude product obtained (15.1 g.) still contains some starting material and, for purpose of purification, it is chromatographed on a 30-fold amount of silicagel with a mixture of hexane and ether (20:1). There are thus obtained 9.3 g. of 8-mercapto-p-menthan-3-yl n-butyrate in the form of a stereoisomer mixture. Odour: fruity, green, like blackberries, cognac and coffee. One fraction, in which the ratio of this mixture amounts to ca. 1:2, shows typical bands in the IR spectrum at 2580 cm.$^{-1}$ (—SH), 1730 cm.$^{-1}$

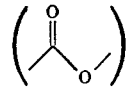

and 1180 cm.$^{-1}$. The nuclear magnetic resonance spectrum shows, inter alia, the following signals which are typical for the compound:

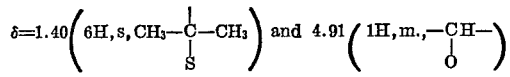

The mass spectrum shows, in addition to the molecular ion peak m/e=258, the fragments m/e=225 (M—SH), 170 (M—C$_3$H$_7$COOH), 137 (170-SH) and 75

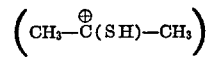

The two isomers are obtained in pure form by preparative gas chromatography:

Isomer A: $n_D^{20}$=1.4800; IR: γ=2580, 1730, 1282, 1182, 1142, 1132, 966 cm.$^{-1}$.

Isomer B: $n_D^{20}$=1.4807; IR: γ=2580, 1728, 1180, 1054, 988 cm.$^{-1}$.

EXAMPLE 5

In an analogous manner to that described in Example 4, from 9.4 g. of 8-mercapto-p-menthan-3-ol, 9.3 g. of isovaleric acid anhydride and 8 g. of pyridine there are obtained 17.8 g. of crude 8-mercapto-p-menthan-3-yl isovalerate in the form of a stereoisomer mixture. After chromatographic purification, there are obtained about 8 g. of an ester mixture free from starting material; $n_D^{20}$=1.4788 to 1.4795; IR: 2580, 1728, 1384, 1366, 1184 cm.$^{-1}$; NMR: δ=0.965, 1.40, 4.92 p.p.m.; MS: m/e=272 (M$^+$), 239, 170, 137, 75. Odour: powdery sweet (weak).

EXAMPLE 6

In an analogous manner to that described in Examples 4 and 5 there are obtained, starting from 9.4 g. of 8-mercapto-p-menthan-3-ol, 9.3 g. of α-methylbutyric acid anhydride and 8 g. of pyridine, 18 g. of crude 8-mercapto-p-menthan-3-yl α-methylbutyrate. The stereoisomer mixture is chromatographed in order to remove unreacted starting material. The pure isomers are isolated by preparative gas chromatography. The main product (8-mercapto-p-menthan-3-yl α-methylbutyrate), $n_D^{20}$=1.4770, shows bands in the IR spectrum at 2580, 1728, 1182 and 1150 cm.$^{-1}$. The mass spectrum shows, in addition to the molecular ion peak m/e=272, the fragments 239, 170, 137, 95, 85, 81 and 75. There are characteristics differences of intensity from the three last-named fragments of the mass spectrum of the ester of Example 5. Odour: ester-like, fatty, fruity, burning.

EXAMPLE 7

9.4 g. of 8-mercapto-p-menthan-3-ol are dissolved in 10 g. of pyridine. 5.9 g. of tiglic acid are added dropwise to the solution with cooling over a period of 15 minutes. The mixture is stirred overnight at room temperature and then worked up in the usual manner. There are obtained 13.2 g. of crude product from which there is isolated by careful chromatography 8-mercapto-p-mentan-3-yl tiglate; $n_D^{20}$=1.5048; IR: 2580, 1704, 1650, 1258, 1138, 984, 738 cm.$^{-1}$. Odour: fruity, spicy, like cassis and thyme.

EXAMPLE 8

7.6 g. of 8-mercapto-p-menthan-3-ol are added dropwise at 0° C. to a mixed anhydride reagent previously prepared from 11 g. of acetic acid anhydride and 5.5 g.

of formic acid. The mixture is subsequently stirred for 10 hours at 0° C. and for a further 10 hours at room temperature. The product is then washed neutral, dried and distilled in a high vacuum. The thus-obtained 8-mercapto-p-menthan-3-yl formate boils at 115° C./0.3 mm. Hg and shows a refractive index $n_D^{20}=1.4925$.

The following example illustrates a typical composition containing one of the p-menthane derivatives provided by the invention:

EXAMPLE 9

An aromatic diluent carrier composition consisting of

| | Percent |
|---|---|
| Acetic acid ester (isobutyl or benzyl) | 0.02 |
| Alpha-irone | 0.02 |
| Nerol | 0.04 |
| Maltol | 0.2 |
| n-Hydroxyphenylbutanone | 0.22 |
| Diosphenol | 0.5 |
| Vanillin | 1.0 |
| Lactic acid and | 1.3 |
| Ethyl alcohol | 96.7 | possesses a raspberry flavour.

Additions of 8-mercapto-p-menthan-3-yl acetate in concentrations of from 0.05% to 0.12% bring about the occurrence of a fresh and typical cassis note instead of the raspberry aroma.

Such an aroma composition can, for example, be used for aromatizing jellies in amounts of 70 g. per 100 kg. of finished product. (See: J. Merory, Food Flavorings, Compositions, Manufacture and Use, Avi Publishing Co., Inc., Westport (1968).)

What is claimed is:
1. Compounds of the general formula

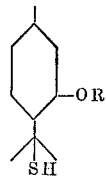

(1)

wherein R represents a hydrogen atom or an acyl group from an alkanoic acid or alkenoic acid having 1–5 carbon atoms.

2. 8-mercapto-p-menthan-3-ol, being a compound of claim 1.

3. 8-mercapto-p-menthan-3-yl acetate, being a compound of claim 1.

4. 8-mercapto-p-menthan-3-yl formate, being a compound of claim 1.

5. 8-mercapto-p-menthan-3-yl n-butyrate, being a compound of claim 1.

6. 8-mercapto-p-menthan-3-yl α-methylbutyrate, being a compound of claim 1.

7. 8-mercapto-p-menthan-3-yl isovalerate, being a compound of claim 1.

8. 8-mercapto-p-menthan-3-yl tiglate, being a compound of claim 1.

References Cited

Chem. Abstracts, 22:2239[3].

VIVIAN GARNER, Primary Examiner

U.S. Cl. X.R.

99—140 R; 252—522; 260—489, 587, 631 R